Aug. 25, 1931.  R. BERINGER  1,820,006
FOUR-SPEED TRANSMISSION
Filed Dec. 24, 1926   2 Sheets-Sheet 1

Inventor
Roscoe Beringer
By Blackmore, Spencer & Hill
Attorneys

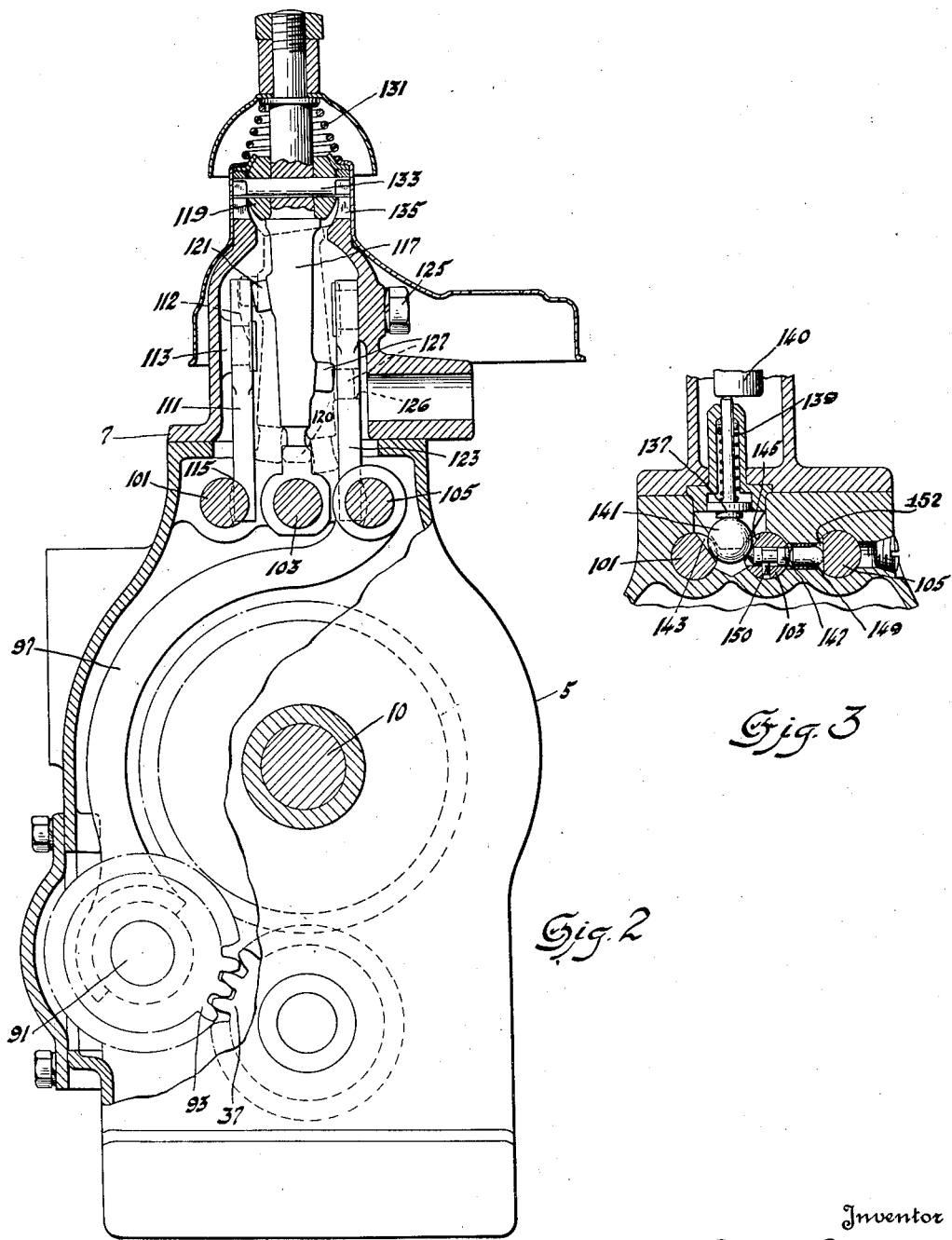

Patented Aug. 25, 1931

1,820,006

UNITED STATES PATENT OFFICE

ROSCOE BERINGER, OF DETROIT, MICHIGAN, ASSIGNOR TO GENERAL MOTORS CORPORATION, OF DETROIT, MICHIGAN, A CORPORATION OF DELAWARE

FOUR SPEED TRANSMISSION

Application filed December 24, 1926. Serial No. 156,884.

This invention relates to transmission gearing and is intended primarily as an improvement in the transmission for motor vehicles. More specifically it is concerned with a four-forward speed transmission to afford a more flexible drive.

Among the objects said to be accomplished are:—

(1) A comparatively silent fourth speed and third speed.

(2) A four-forward speed having a shifting arrangement analagous to the standard shifting arrangement.

(3) A shifting arrangement having provision to prevent accidental shifting into reverse.

Other advantages will be obvious upon the reading of the following specification and an examination of the accompanying drawing.

On the drawings:

Figure 2 is an end elevation partly broken away and in section.

Figure 3 is a section on line 3—3 of Figure 1.

Figure 1:
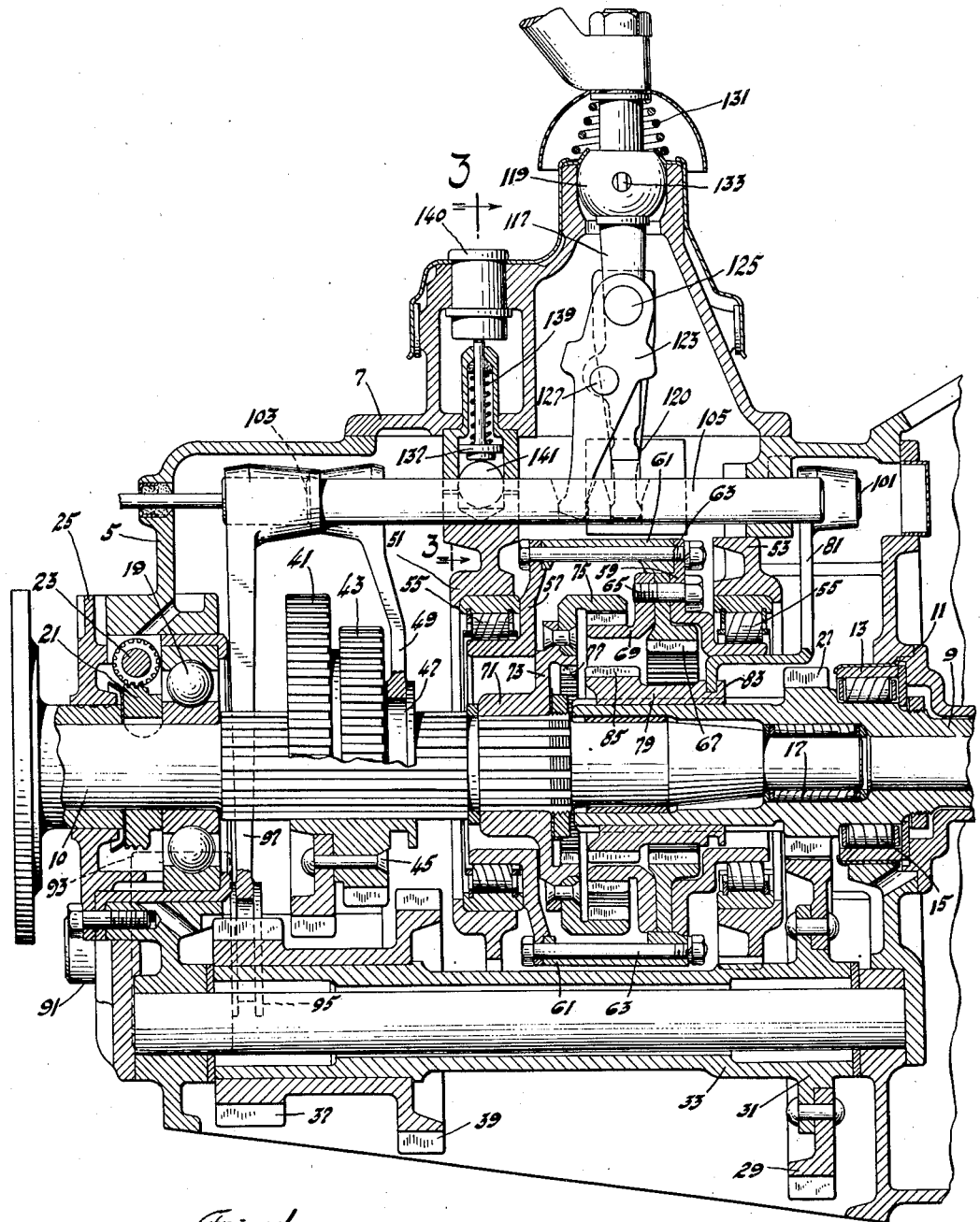
Figure 1 is a vertical longitudinal section of the vehicle transmission having my improvements incorporated therein.

Referring by reference characters to the drawings, numeral 5 represents the transmission housing having a cover 7. Entering the front end of the housing is a shaft 9 which shaft is driven by the motor of the vehicle through the clutch in the usual way. The opening 11 in the casing wall is provided with a sleeve 13 carrying a bearing 15 to secure an anti-friction support for the shaft 9. Aligned with shaft 9 is a driven shaft 10, this shaft being the so-called transmission or spline shaft. It is reduced adjacent the forward end and piloted within the bored out end of the shaft 9 where it is journalled by means of bearings 17. The rear casing wall carries a bearing 19 for the transmission shaft. There is keyed to this shaft beyond the bearing a gear 21 to drive the speedometer drive shaft 23 within the cover member 25, these parts constituting no part of my invention.

Shaft 9 just within the bearing 15 is formed with external teeth constituting a driving gear 27. This gear 27 is in constant engagement with gear 29 riveted to a flange 31 on countershaft 33, the countershaft being rotatively carried in the housing. Countershaft 33 at its other end is equipped with a pair of gears 37 and 39 for driving the transmission shaft in low and at intermediate speed. Mounted to slide on the transmission shaft is a pair of gears 41 and 43 secured together by fastening means 45. This double gear has a collar 47 to be engaged by fork 49 carried by one of the usual sliding rods. The engagement of gear 41 with gear 37 gives low speed and the engagement of gear 43 with gear 39 gives second or intermediate speed.

Within the housing are two transverse partitions 51 and 53 having openings which are in alignment but which openings are eccentric relative to the axis of the aligned shafts. Within each opening is a bearing 55 journalling the end walls 57 and 59 of a cage or barrel, which is completed by a spacer 61 and bolts 63. It will be seen that the inner bearing races are integral outwardly directed portions of the gear cage. Within the cage so formed, and adjacent wall 59 are fastened by means of bolts 65 a pair of gears 67 and 69. Gear 67 is an internal gear and gear 69 is of L-shape and has teeth constituting an external gear. Secured to the transmission shaft at a point where it is reduced to enter the shaft 9, and just within in the cage is sleeve 71 having a flange 73 to which is fixed by rivets an L-shaped gear 75 having internal teeth to engage the external teeth 69. When the cage is rotatably driven it drives at a slightly reduced speed the transmission shaft through the gearing elements 69 and 75. In addition to carrying the aforesaid internal gear 75 sleeve 71 is formed with inwardly directed teeth 77 to serve as clutch teeth for a direct drive as will now be explained.

Inwardly of gear 27 on the shaft 9 the shaft is splined to slidably carry a sleeve 79. An angular fork member 81 enters the cage and engages a collar 83 formed on sleeve 79. At the other end sleeve 79 has external teeth forming a gear 85 for engaging at time with gear 67.

It will be observed that when sleeve 79 is reciprocated towards the right in Figure 1 its gear 85 engages gear 67 of the cage and rotates the same, and the cage through gear elements 69 and 75 rotates the transmission shaft at a reduced speed. Each of said gear sets affords a slight reduction between the driving and driven shaft. When sleeve 79 is reciprocated to the left in Figure 1 its external teeth 85 slide into clutch engagement with clutch teeth 77 on the flange of sleeve 71 whereby the driving and driven shafts are clutched together in direct driving relation.

It will be observed from what has been set forth that the transmission gives four-forward speeds, a direct high speed, a step-down through a pair of internal-external gear trains, and intermediate speed and low speed through spur gear trains between the countershaft and the transmission shaft. It should also be noted that since there are two gear trains in the first step-down, the reduction is divided between the two and the number of teeth in the two gears of each set may be so nearly alike that these external-internal gear trains are almost noiseless.

For driving in reverse there is provided a shaft 91 upon which is slidably mounted a spur gear 93 having a collar 95 engaged by a fork 97 the latter having a long arm extending downwardly from its rod. This gear 93, as shown by dotted lines on Figure 1, is always in mesh for a part of its length with gear 37 and when moved to the right in Figure 1 also engages gear 41, whereupon the driven shaft is rotated at a slow speed in the reverse direction.

The three sliding rods are designated by numerals 101, 103 and 105. Rod 101 carries the fork 81 for operating sleeve 79 and gear 85 to obtain fourth and third speed drives. Rod 103 carries fork 49 for operating gears 41 and 43 for low and intermediate speeds. Rod 105 carries fork 97 for obtaining reverse drive. The direction of movement of gear 85 is such that in order to secure the customary and standard movement for the operating lever means is introduced to reverse the action of the lever upon the sliding sleeve 79. To effect this reversing there is provided a lever 111 pivoted to the cover of the transmission housing at 113. It is this lever which engages the rod at 115 instead of the hand lever 117. The upper end of lever 111 is recessed at 112 and the hand lever is provided below the ball pivot 119 with a stud 121 which engages the recess 112 when the hand lever is moved laterally to make the shift into direct or into third speed. Thereafter fore and aft movements of the hand lever make the required shifts through the lever 111 and rod 101. The hand lever engages directly within a through slot 120 formed in a part carried by the second rod which may be reciprocated for intermediate and low speeds.

For reverse speed it is also desirable to employ an amplifying means between the hand lever and the operating rod 105. For this purpose I employ a lever 123 pivoted to the housing cover at 125. The lever has a recess 126 engageable with a stud 127 and the hand lever 117. The movement of the reverse idler to engage gear 41 is greater than the usual gear movement. To secure this longer movement without providing an unduly long movement for the hand lever 117 I provide unequal arms on lever 123. It will be seen that the stud 127 engages the lever 123 substantially midway between its pivot and the end of the lever which moves the shift rod 105. This actuating mechanism also provides a convenient means to prevent accidental shifting into reverse. The recess 126 is so positioned that the stud 127 will not engage therein until the lever 117 has been pushed down. This will be clear through an inspection of Figure 2. Spring 131 normally holds the hand lever in its uppermost position and in operative position for all shifts except that into reverse. The ball carries a trunnion 133 slidable in slot 135 whereby the lever as a whole may be pushed down against the tension of the spring 131 to an extent to permit the engagement of the stud 127 in recess 126 after which engagement the shift into reverse is possible.

Figure 3 shows the modified lock and interlock which is used to insure the longitudinal movement of one only of the three rods at a time. A plunger 137 is downwardly pressed by spring 139 and a lock device 140 of any desired type may hold the plunger in its downward position. The plunger engages a ball 141 which when the device is in locked position engages notches 143 and 145 in rods 101 and 103. Two pins 147 and 149 are provided. The ball engages the end of pin 147 which pin is slidable in an opening in rod 103. Pin 147 engages the end of pin 149 which is slidable in an opening in the transmission housing. At its other end pin 149 may engage in notch 152 in rod 105. In the position of parts shown in Figure 3 it will be seen that the ball 141 engages the notches in rods 101 and 103 and prevents movement. It will also be seen that the ball engages the end of pin 147, which latter is holding pin 149 in the notch of rod 105. Lock 140 prevents the movement of the ball 141 with the result that the transmission is fully locked. When the lock device 140 is released any one of the shifter rods may be moved by a proper movement of the hand lever but the interlocking arrangement which includes the ball 141 and the pins 147 and 149 prevents either of the other rods being moved. If for example rod 101 is shifted ball 141 is movable to lock rod 103 to the casing and the ball through the agency of pins 147 and 149 prevents movement of rod 105. If on the other hand rod 103 is moved the ball 141 locks rod 101 and the peripheral surface of rod 103 engages the end of pin 149 so that it maintains its locking engagement with rod 105. Should rod 105 be moved pin 149 is moved to the left and locks rod 103 to the housing, and at the same time moves pin 147 sufficiently to cause ball 141 to lock rod 101. To prevent pin 147 from at any time projecting from rod 103 and locking it to the casing, the pin 147 is provided with a reduced portion between its ends, which reduced portion is engaged by a pin 150 carried by rod 103.

By the arrangement above described a silent third and fourth speeds are accomplished permitting the use of a more advantageous drive ratio between the driven pinion on the rear axle. The standard shifting movements for the hand lever are provided on the conventional lock and interlock has been somewhat modified to accommodate the three shift rods.

I claim:—

1. In a transmission for vehicles, aligned driving and driven shafts, a hollow gear element eccentrically surrounding said aligned shafts, a gear on said driven shaft, a co-operating first gear carried by said hollow gear element whereby said hollow gear element is in constant driving relation with said driven shaft, a second gear carried by said hollow gear element clutch means carried by the driven shaft, a clutch gear member slidable on said driving shaft into gear engagement with said second gear of the hollow gear element or into clutch engagement with said driven shaft clutch means said first-mentioned gear of the hollow gear element being an external gear and the engaged gear of the driven shaft being a surrounding internal gear to effect a gear reduction clutch means, a plurality of spaced bearings for rotatably supporting said hollow gear element, all of said clutch and gear elements being located between said spaced bearings.

2. The invention defined by claim 1, wherein the second mentioned gear of the hollow gear element is an internal gear and the driving gear slidable on the driving shaft is an external gear whereby the hollow gear element may be driven from the driving shaft at a reduced speed.

In testimony whereof I affix my signature.

ROSCOE BERINGER.